United States Patent
Vangelov

(10) Patent No.: US 9,940,762 B2
(45) Date of Patent: Apr. 10, 2018

(54) SYSTEMS AND METHODS FOR IDENTIFICATION OF A COMPROMISED MODULE

(71) Applicant: Ford Global Technologies, LLC, Dearborn, MI (US)

(72) Inventor: John Vangelov, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 118 days.

(21) Appl. No.: 14/036,687

(22) Filed: Sep. 25, 2013

(65) Prior Publication Data

US 2015/0088370 A1    Mar. 26, 2015

(51) Int. Cl.
*G07C 5/08* (2006.01)
*H04W 4/22* (2009.01)
(Continued)

(52) U.S. Cl.
CPC ............ *G07C 5/0808* (2013.01); *G06F 8/65* (2013.01); *G07C 5/008* (2013.01); *G07C 5/0858* (2013.01);
(Continued)

(58) Field of Classification Search
CPC .... G07C 5/008; G07C 5/0808; G07C 5/0858; G07C 2205/02; G06F 8/65;
(Continued)

(56) References Cited

U.S. PATENT DOCUMENTS 5,442,553 A * 8/1995 Parrillo ......................... 455/420
6,047,679 A * 4/2000 Matsumoto ........... F02D 11/107
123/396
(Continued)

FOREIGN PATENT DOCUMENTS

CN    101315651 A    12/2008
CN    101625570 A    1/2010
(Continued)

OTHER PUBLICATIONS

Walter J. Buga, How to make Connected Car Reality?, Automotive Lunux Summit, Sep. 2012.*
Chinese Office Action for Chinese Application No. 2014104979162 dated Jan. 22, 2018.

*Primary Examiner* — Thomas Ingram
(74) *Attorney, Agent, or Firm* — Jennifer M. Stec; Brooks Kushman PC.

(57) ABSTRACT

A vehicle computing system having a computer processor in communication with a wireless transceiver, such that the wireless transceiver is capable of communication with a wireless communication device located remotely from the processor. The computer processor may be configured to receive input identifying at least one checksum value from one or more modules in the vehicle. The computer processor may transmit the at least one checksum value to a remote server through the wireless communication device. The remote server may compare the at least one checksum value to a predetermined value. Based on the compared results, the processor may receive one or more messages from the remote server to indicate whether the at least one checksum is equal to the predetermined value. The processor may generate one or more remedial actions if the at least one checksum is not equal to the predetermined value.

18 Claims, 6 Drawing Sheets

(51) Int. Cl.
*H04W 4/00* (2009.01)
*G07C 5/00* (2006.01)
*G06F 11/14* (2006.01)
*G06F 17/00* (2006.01)
*B60R 16/02* (2006.01)
*B60R 16/03* (2006.01)
*G06F 9/445* (2018.01)
*B60R 16/023* (2006.01)
*B60W 50/04* (2006.01)

(52) U.S. Cl.
CPC .............. *H04W 4/008* (2013.01); *H04W 4/22* (2013.01); *B60R 16/0234* (2013.01); *B60R 16/0315* (2013.01); *B60W 2050/043* (2013.01); *G06F 11/1417* (2013.01); *G06F 11/1433* (2013.01); *G06F 17/00* (2013.01)

(58) Field of Classification Search
CPC .. G06F 11/1417; G06F 11/1433; G06F 17/00; B60R 16/0234; B60R 16/0315; B60W 2050/43; H04B 1/38
See application file for complete search history.

(56) References Cited

U.S. PATENT DOCUMENTS

| | | | |
|---|---|---|---|
| 8,036,647 | B2 | 10/2011 | Matsumura et al. |
| 8,370,020 | B2* | 2/2013 | Bauman et al. .............. 701/33.2 |
| 2006/0178792 | A1* | 8/2006 | Ortiz et al. ...................... 701/33 |
| 2007/0101236 | A1* | 5/2007 | Bauerle ................ G06F 11/1004 714/763 |
| 2008/0177436 | A1* | 7/2008 | Fortson ........................... 701/29 |
| 2008/0316006 | A1* | 12/2008 | Bauman et al. ............ 340/425.5 |
| 2009/0125178 | A1* | 5/2009 | Wilson ................... G07C 5/008 701/31.4 |
| 2009/0306849 | A1* | 12/2009 | Blanz et al. .................... 701/33 |
| 2011/0307879 | A1* | 12/2011 | Ishida et al. ................... 717/170 |
| 2012/0084039 | A1* | 4/2012 | Wang et al. ................... 702/104 |
| 2012/0089684 | A1 | 4/2012 | Angus et al. |
| 2013/0246135 | A1* | 9/2013 | Wang ........................... 705/14.4 |
| 2013/0261884 | A1* | 10/2013 | Richards et al. ............. 701/34.4 |
| 2014/0237464 | A1* | 8/2014 | Waterman et al. ........... 717/172 |

FOREIGN PATENT DOCUMENTS

| | | |
|---|---|---|
| CN | 103163875 A | 6/2013 |
| EP | 2267292 A1 * | 12/2010 |

* cited by examiner

SYSTEMS AND METHODS FOR IDENTIFICATION OF A COMPROMISED MODULE

TECHNICAL FIELD

Various embodiments relate to identifying software changes in a vehicle computing system.

BACKGROUND

U.S. Pat. No. 8,036,647 generally discloses a vehicle information communication system including a management server whereby an information terminal connected to a network and an on-vehicle device of the vehicle are in communication with each other. The management server includes a contractor confirming part configured to send contractor information of the vehicle information communication system to the vehicle.

U.S. Pat. No. 8,370,020 generally discloses a method and system for communicating vehicle diagnostic data to a vehicle service provider. The system employs sensors for generating sensor signals indicative of the status or condition of vehicle components. A diagnostics module in the vehicle generates diagnostic data based on the sensor signals and transfers the diagnostic data to a communications module of a hands-free phone system in the vehicle. The communications module wirelessly communicates the diagnostic data to a Bluetooth enabled cell phone in the vehicle using Bluetooth communications. The cell phone communicates the diagnostic data to an Internet server via the Internet. The provider accesses the diagnostic data from the Internet server using a computer connected to the Internet to determine if any of the vehicle components are in need of repair or maintenance. The provider notifies a user of the vehicle of any vehicle component that is in need of repair or maintenance.

U.S. Patent Application 2012/0089684 generally discloses methods and apparatus for use in communicating between a vehicle and a remote application server. An application message is received from a vehicle. A computer system determines whether an uplink connection can be established between the computer system and a remote application server that provides a remote software application associated with the application message. The application message is redirected to a local software application executed by the computer system when an uplink connection cannot be established. Data may be subsequently synchronized between the local software application and the remote software application.

SUMMARY

In a first illustrative embodiment, a vehicle computing system having a computer processor in communication with a wireless transceiver, such that the wireless transceiver is capable of communication with a wireless communication device located remotely from the processor. The computer processor may be configured to receive input identifying at least one checksum value from one or more modules in the vehicle. The computer processor may transmit the at least one checksum value to a remote server through the wireless communication device. The remote server may compare the at least one checksum value to a predetermined value. Based on the compared results, the processor may receive one or more messages from the remote server to indicate whether the at least one checksum is equal to the predetermined value. The processor may generate one or more remedial actions if the at least one checksum is not equal to the predetermined value.

In a second illustrative embodiment, a vehicle computing system having a computer processor in communication with a wireless transceiver, such that the wireless transceiver is capable of communication with a server located remotely from the processor. The computer processor may be configured to receive input identifying a test value from one or more modules in a vehicle. The computer processor may transmit the test value to the server such that the server evaluates the test value to determine if the test value is correct or incorrect. The computer processor may receive one or more messages from the server to indicate whether the test value is correct or incorrect, and generate one or more remedial actions if the test value is not correct.

In a third illustrative embodiment, a method that may receive input identifying a test value from one or more modules in a vehicle. The method may transmit the test value to a remote server, such that the remote server evaluates the test value to indicate whether the test value is correct or incorrect. The method may receive one or more messages from the remote server to indicate whether the test value is correct or incorrect. The method may generate one or more remedial actions if the test value is not correct.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
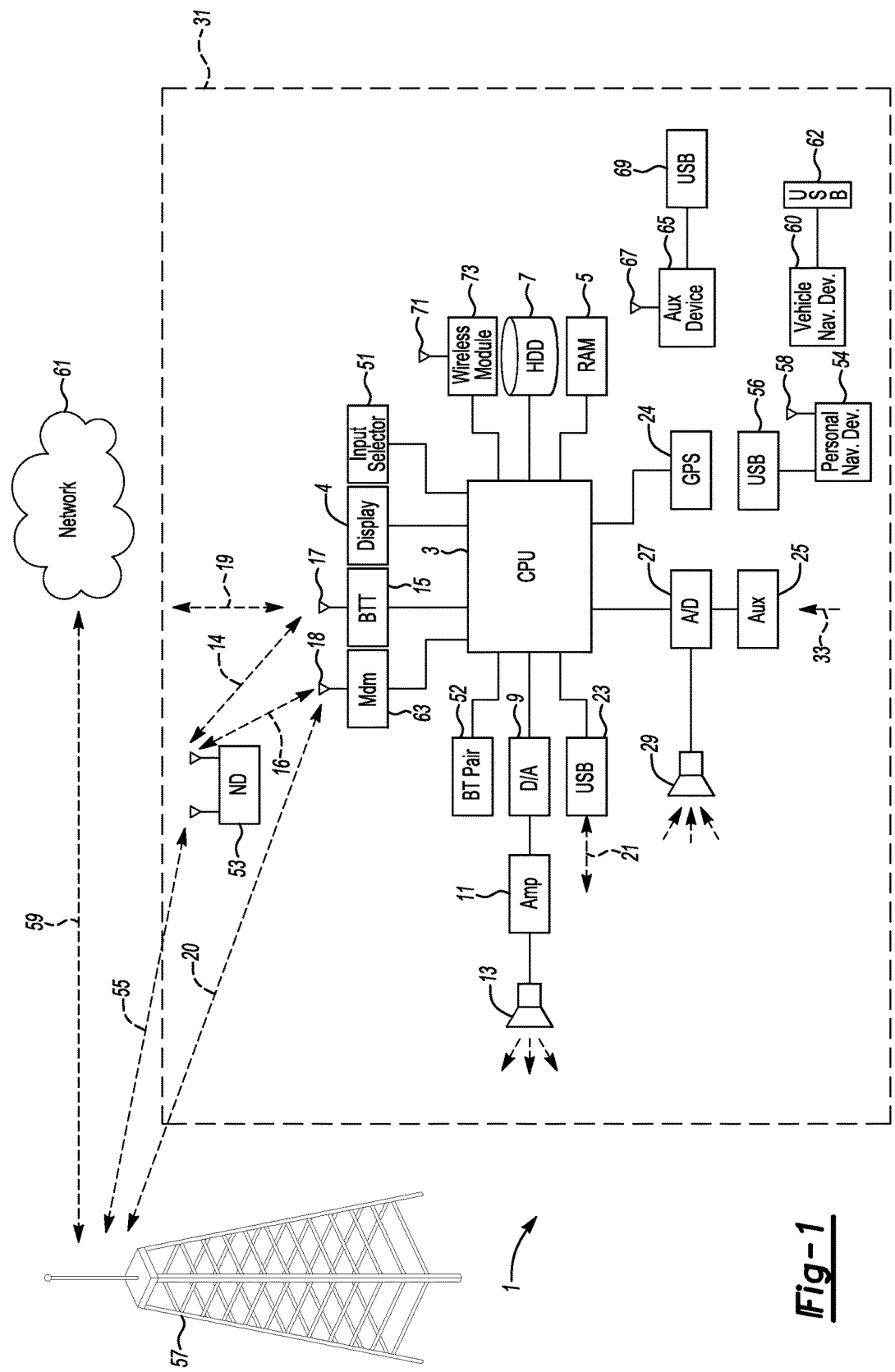
FIG. 1 illustrates an example block topology for a vehicle based computing system for a vehicle.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
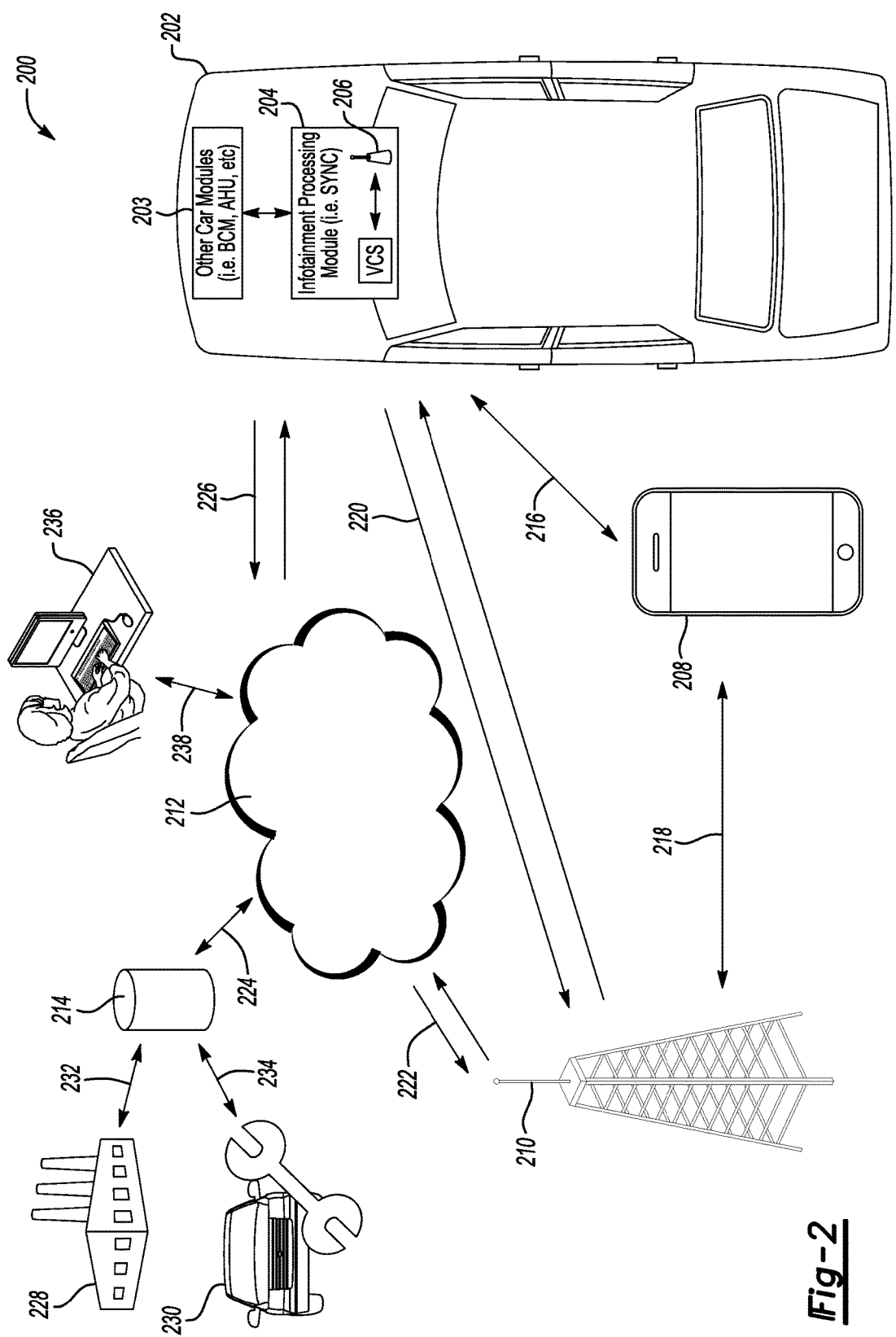
FIG. 2 illustrates an example block topology for a vehicle based computing system communicating with a remote server.

FIG. 2 illustrates an example block topology for a vehicle based computing system communicating with a remote server. In one embodiment of the present disclosure, a nomadic device 208 communicating with the VCS 204 using BLUETOOTH technology may establish wireless communication with a terrestrial tower 210. The terrestrial tower 210 in turn may establish communication through a telephone switching network with a remote server 212. The remote server 212 may be in communication with an original equipment manufacturing database 214. The original equipment manufacturing database 214 may include information from a dealership network 230, assembly plant network 228, and/or aftermarket sales network.

In another embodiment of the present disclosure, an embedded cellular phone within the VCS 204 may establish direct communication with a terrestrial tower 210 using a wireless transceiver 206. The vehicle 202 may have data uploaded and downloaded for one or more modules 203 by communicating from the VCS 204 with an embedded cellular phone to the remote server 212.

In one illustrative embodiment, the VCS 204 may communicate with a wireless device, or a remote computing system connected through the wireless device, for communication to the remote server 212. The wireless device may include, but is not limited to, an embedded cellular modem, embedded WiFi device, Bluetooth transmitter, Near Field Communication connected to phone, brought-in cellular device like a USB modem, MiFi, portable cellular phone that may be connected to the vehicle through SYNC or other Bluetooth pairing device, or a PC network that may be connected to the vehicle through SYNC or other Bluetooth pairing device. The VCS 204 may wirelessly communicate a data transmission with the remote server 212 with the use of a wireless device 208. Once the vehicle system has enabled communication with the remote server 212, information can proceed to be downloaded and uploaded from the server to begin determination if the software in one or more modules 203 has been hacked, updated, modified, and/or corrupted.

The VCS 204 may also communicate with a network having associated storage hosting a plurality of web pages for internet access by a plurality of browsers, including but not limited to assembly plants, dealerships, service garages, original equipment manufacturer (OEM) database, etc. Some browsers, such as cellular telephone owners may upload data over Internet to storage, and other browsers, such as an OEM network may download data to the remote server. The data may be uploaded and downloaded using several types of transmission mediums including, but not limited to, narrowband, broadband, and/or voice over internet protocol.

The remote server 212 may receive a transmission of a set of data about the one or more modules 203 in a vehicle 202 including, but not limited to, a checksum value associated with the one or more modules. In one embodiment, a method for transmitting this information may include, but is not limited to, in-band modem or data-over-voice. Once the information is received by the remote server 212, one or more algorithms may be used to interrupt the data so that the vehicle identification number is used with the information. The remote server may compare the received data to the associated stored data received from the manufacturing database 214 when the vehicle was assembled. The receive vehicle data may also be presented at a computer terminal 236 in communication with the remote server. Once the set of data has been transmitted to the remote server, the server may compare the checksum value that was received to a checksum value that is associated with that vehicle identification number. If the received checksum value from one or more control modules does not match the stored checksum value, the remote server may send a message to the VCS 204 indicating that the software in the one or more modules may be corrupted.

The vehicle computing system may take one or more remedial actions once it has received a message from the remote server indicating that the software in one or more modules may be corrupted. The one or more remedial actions may include, but is not limited to, a display on at least one output, one or more indicator lamps on an instrument cluster, and/or a limited power engine mode. The one or more remedial actions may also include, but is not limited to, the vehicle computing system requesting a re-flash of the one or more modules that have been discovered to have an unequal checksum value compared to what is stored in the remote sever and/or database. The re-flash may be initiated by several factors including, but not limited to, a key-off event, a key-on event, and/or during a vehicle idle state.

Figure 3:
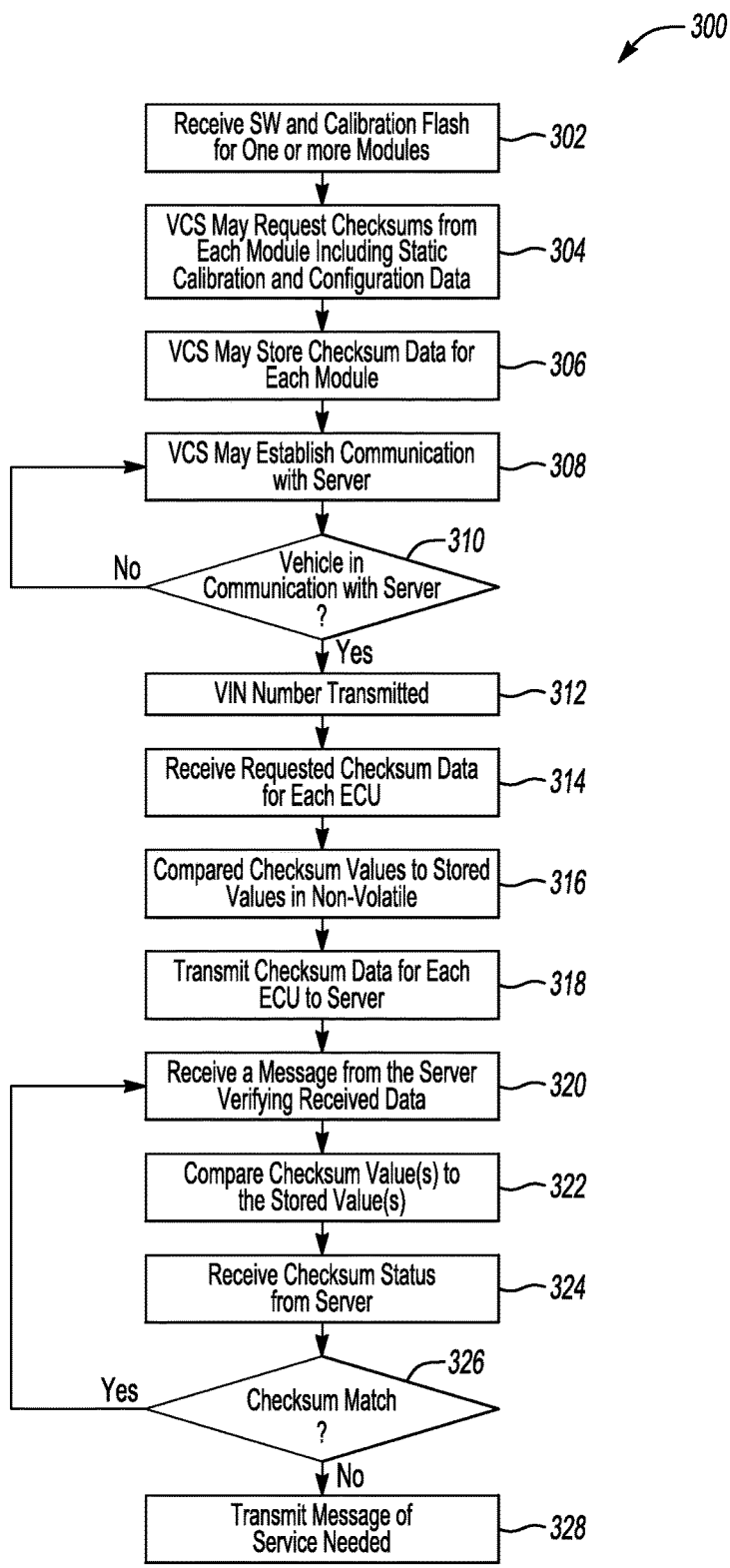
FIG. 3 is a flow diagram illustrating an example process for implementing embodiments of the present disclosure.

FIG. 3 is a flow diagram illustrating an example process for implementing embodiments of the present disclosure. The method is implemented using software code contained within the vehicle control module, according to one or more embodiments. In other embodiments, the method 300 is implemented in other vehicle controllers, or distributed amongst multiple vehicle controllers.

Referring again to FIG. 3, the vehicle and its components illustrated in FIG. 1 are referenced throughout the discussion of the method to facilitate understanding of various aspects of the present disclosure. The method of monitoring one or more modules in a vehicle may be implemented through a computer algorithm, machine executable code, or software instructions programmed into a suitable programmable logic device(s) of the vehicle, such as the vehicle control module, the vehicle communication module, other controller in communication with vehicle computing system, or a combination thereof. Although the various steps shown in the flowchart diagram 300 appear to occur in a chronological sequence, at least some of the steps may occur in a different order, and some steps may be performed concurrently or not at all.

At step 302, the vehicle computing system is flashed with a particular software and/or calibration for the one or more control modules in a vehicle based on a specification list required to implement and enable functions/features for that vehicle. For example, during the assembly process a vehicle is built based on a specification to have one or more features and/or functions enabled such that the software and calibration for that vehicle may be specific to those features and/or functions. An original equipment manufacturer (OEM) assembly plant and/or a vehicle dealership may be able to track and store at a server the specific software and calibration flashed into a vehicle based on a vehicle identification number (VIN).

The software and calibration flash/update for a vehicle may be saved at a database and/or in a remote sever. The database and/or server may store the software and calibration flashed/updated to a vehicle based on a VIN during assembly. The database and/or server may update the software and calibration flashed/updated to a vehicle based on a dealership, service, and/or aftermarket sales updating of the one or more modules.

At step 304, after the calibrations and configurations are flashed into one or more modules, the vehicle computing system may request the checksum values for each module. The one or more modules may transmit to the vehicle computing system their software strategy, static calibration, and static configuration data. The vehicle computing system may store the checksum data for each control module on the vehicle in a specific non-volatile memory in one or more modules assigned by the system at 306.

In one example, the vehicle computing system may store a test value that may be generated based on a number of factors including, but not limited to, software and calibrations flashed/updated to a module. The test value may be used to determine whether a module has been compromised in the vehicle computing system. The system may evaluate the test value based on a correct or incorrect calculation to determine a compromised module.

In another example, the vehicle computing system may transmit to a remote server the initial requested calibrations and configurations to the one or more modules after the initial flash is complete at the assembly plant. The server location may include, but is not limited to, a cloud, database, and/or a network of databases in communication. The remote server may associate, cross-reference, and/or store the one or more module checksum values (and/or test values) based on the VIN.

At step 308, the vehicle computing system may establish communication with the server using one or more wireless technologies including, but not limited to, an embedded cellular modem, embedded WiFi device, Bluetooth transmitter, Near Field Communication connected to phone, brought-in cellular device like a USB modem, MiFi, smartphone that may be connected to the vehicle through SYNC or other Bluetooth pairing device, or a PC network that may be connected to the vehicle through SYNC or other Bluetooth pairing device. The vehicle may initiate communication with the server and determine if the connection was successful at step 310.

At step 312, if the vehicle computing system is connected to the server, the system may transmit the VIN to the server to initiate the monitoring of the one or more modules in a vehicle. The vehicle computing system may receive an additional updated status check of the checksum data from the one or more electronic control units in the vehicle at step 314. The vehicle computing system may continuously monitor checksum values of the one or more modules and compare them to the stored values in the non-volatile memory of the system at step 316.

For example, the module in the vehicle computing system responsible for assuring security of the one or more modules may periodically poll the modules in the system in order to verify the checksums remain as intended and/or as they were manufactured at the assembly plant. The module responsible may also verify its stored checksum information via a cloud access to a secure server location and/or dealer network that can access the vehicle build information based on the VIN.

At step 318, the vehicle computing system may transmit the checksum data for each electronic control module to the server in communication with the system. The server may transmit a message to the vehicle computing system to let the system know that the checksum data was received at step 320.

At step 322, the server may evaluate the received checksum value(s) from the one or more modules in a vehicle and compare them to the stored values associated with the VIN of the vehicle. Once the server has determined whether or not the checksum value(s) have been corrupted, hacked, and/or altered, the vehicle computing system may receive the checksum value statues for the one or more modules from the server at step 324.

At step 326, the vehicle computing system may determine whether the one or more modules in the vehicle have the correct checksum values based on the data received from the server and/or from the analysis of the checksum values by the system. At step 328, in the event that the checksum value(s) for a given module do not match, the customer of the vehicle may be instructed to visit a dealer for service, and/or a cloud enabled communication with the vehicle may attempt to correct the issue by re-applying/re-flashing the required software, calibration, and/or configuration data or reprogramming the strategy.

Figure 4:
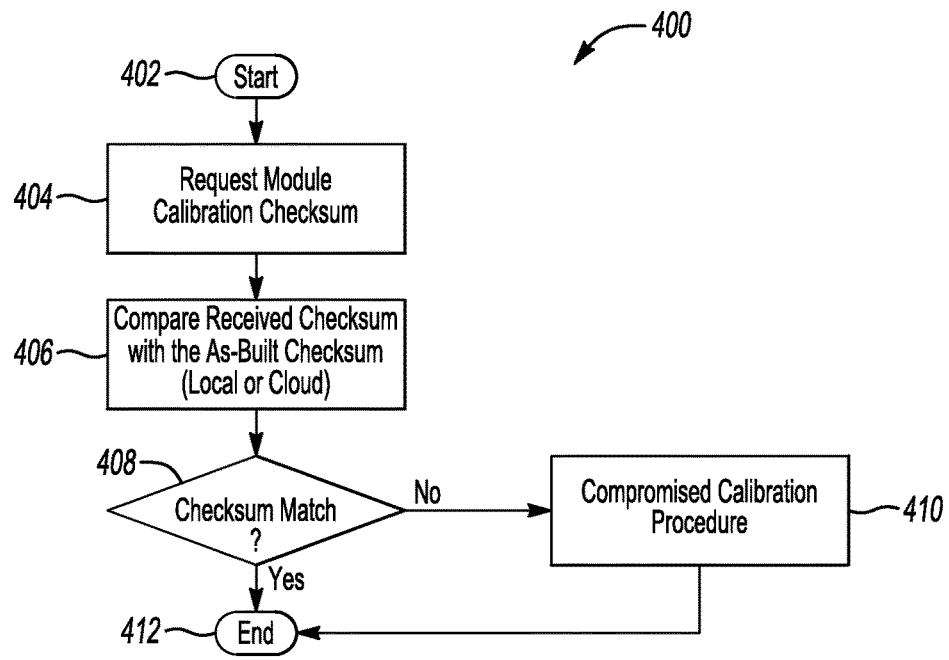
FIG. 4 is a flow chart illustrative of a vehicle computing system for determining compromised calibration of one or more modules.

FIG. 4 is a flow chart illustrative of a vehicle computing system for determining compromised calibration of one or more modules. The vehicle computing system may have one or more algorithms monitoring and verifying calibration checksum values(s) from one or more modules in a vehicle. In this example, the one or more algorithms may determine if the one or more modules in a vehicle have altered, corrupted, and/or hacked calibration values.

At step 402, the one or more algorithms may be initiated based on several factors including, but not limited to, a key-on event, a timer, a request received by the system, and/or a service tool. The system may request a read of one or more module calibration checksum values at step 404. The one or more modules may receive the request and transmit the current calibration checksum value to the module assigned by the vehicle computing system.

At step 406, the vehicle computing system may compare the received checksum value of the one or more modules and compare it with the as-built checksum value of that respective module stored in non-volatile memory. The vehicle system may also transmit the received checksum value to a remote server having the as-built/service-updated checksum value, such that the remote server may compare the two values. The vehicle system may transmit to the remote server using wireless technology including, but not limited to, a wireless transceiver, WiFi, Bluetooth, an embedded phone, and/or a smart phone in communication with the system using Bluetooth technology.

At step 408, the vehicle system may determine either in-vehicle or receiving the checksum analysis from a remote server if the checksum value matches between the one or more modules and the as-built/service-updated checksum values. If the checksum value(s) do not match the as-built values stored in the vehicle system non-volatile memory or at a remote server, then the system may enter into a compromised calibration procedure at step 410.

The compromised calibration procedure may allow for the one or more modules checking security to retrieve and program the appropriate calibration for the affected module, delivering through the cloud back-end services. The programming for the affected module may be done at an appropriate time when the vehicle is at an idle condition, during a key-on initialization event delaying the start of the vehicle, or a key-off event delaying the shutting down of the vehicle system until the programming is complete.

For example, the system may receive a message from the cloud that the checksum value for a module in the vehicle does not match the as-built checksum value therefore the system may transmit a message to the driver that service is requested. The vehicle system may also allow the remote server to retrieve and program the appropriate calibration for the affected module by setting a software flag in the vehicle system to notify the driver that one or more modules may be programmed at an appropriate time (e.g., key-on of the vehicle). The system may allow the driver to select an acceptance button using an infotainment knob at a vehicle key-on event to allow the one or more modules to begin programming with the correct calibration delivered through the cloud back-end services to the vehicle system. During the programming of the module, the vehicle start may be delayed until the vehicle system receives a complete programming message from the one or more modules being updated.

Figure 5:
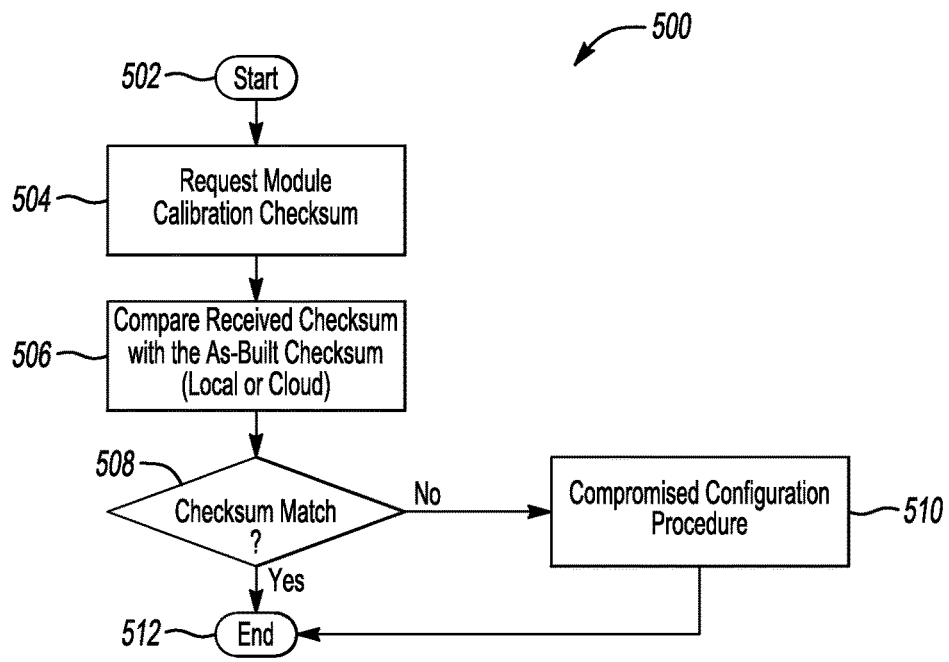
FIG. 5 is a flow chart illustrative of a vehicle computing system for determining compromised configuration of one or more modules.

FIG. 5 is a flow chart illustrative of a vehicle computing system for determining compromised configuration of one or more modules. The method of monitoring a compromised configuration in one or more modules for a vehicle computing system may be implemented through a computer algorithm, machine executable code, or software instructions programmed into a suitable programmable logic device(s) of the vehicle, such as the vehicle control module, the vehicle communication module, other controller in communication with vehicle computing system, or a combination thereof.

At step 502, the method may be started based on several factors including, but not limited to, the initiation of the vehicle computing system during a vehicle ignition-on event. The system may request a read of one or more module configuration checksum values at step 504. The one or more modules may receive the request and transmit the current configuration checksum value to the module assigned by the vehicle computing system.

At step 506, the vehicle computing system may compare the received configuration checksum value of the one or more modules and compare it with the as-built/service-updated-flash configuration checksum value of that respective module stored in non-volatile memory. The vehicle system may also transmit the received configuration checksum value to a remote server having the as-built configuration checksum value, such that the remote server can compare the two values. The vehicle system may transmit and receive messages to/from the remote server using wireless technology including, but not limited to, a wireless transceiver, WiFi, Bluetooth, an embedded phone, and/or a smart phone in communication with the system using Bluetooth technology.

At step 508, the vehicle system may compare the checksum values either in-vehicle or receive the checksum analysis from a remote server to determine if the checksum values of the one or more modules match the as-built checksum values stored when the vehicle was assembled. In another example, a vehicle may have the one or more modules flashed after assembly. The vehicle computing system and remote server may receive the latest flash of software, calibration, and/or configurations so that the vehicle computing system is comparing the received checksum values to the updated checksum values in the vehicle.

If the checksum value(s) do not match the as-built values stored in the vehicle system non-volatile memory or at a remote server, then the system may enter into a compromised configuration procedure at step 510. The compromised configuration procedure may allow for the one or more modules checking security to retrieve and program the appropriate configuration delivered through the cloud back-end services for the affected module. The programming for the affected module may be done at an appropriate time when the vehicle is at an idle condition, during a key-on initialization event delaying the start of the vehicle, or a key-off event delaying the shutting down of the vehicle system until the programming is complete.

Figure 6:
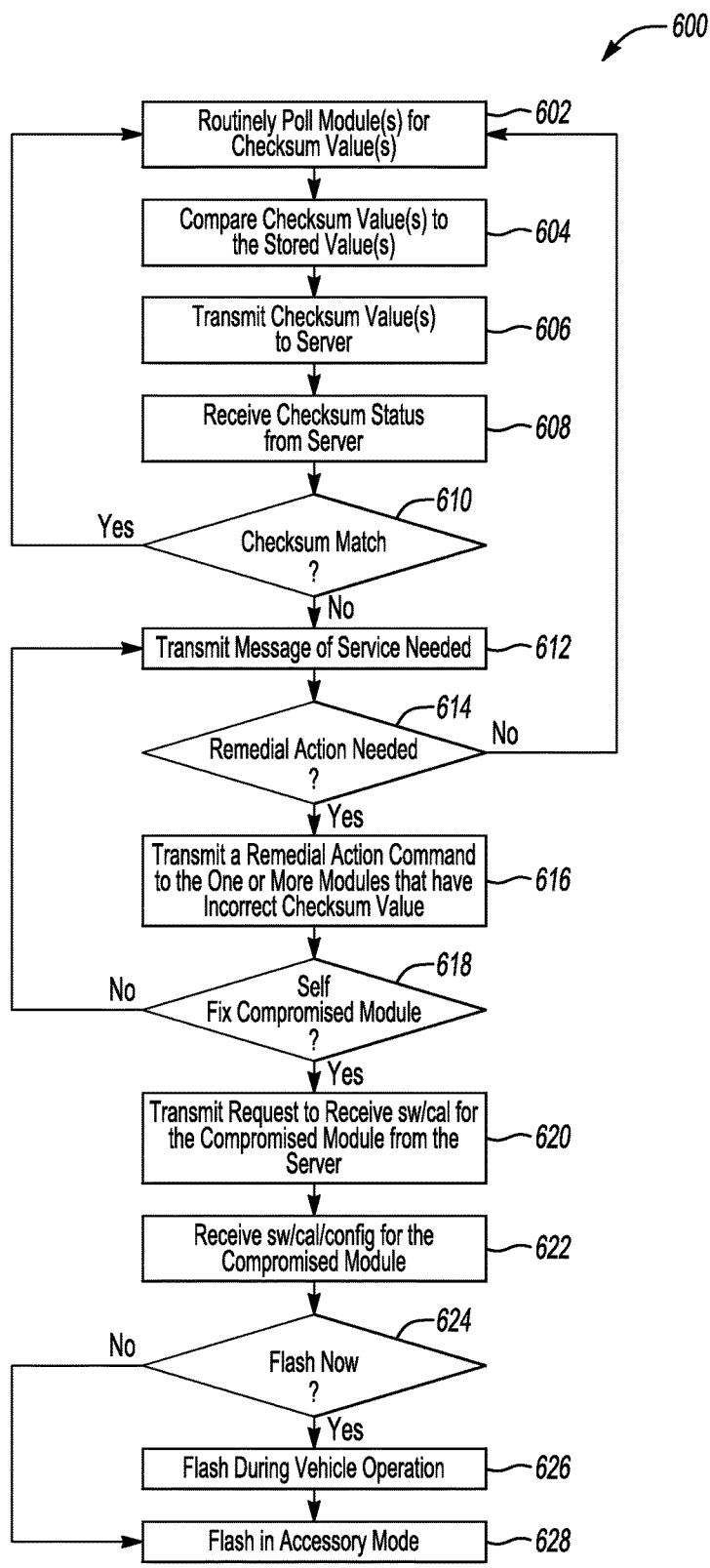
FIG. 6 is a flow chart illustrative of a vehicle computing system for determining a remedial action for a compromised module.

FIG. 6 is a flow chart illustrative of a vehicle computing system for determining a remedial action for a compromised module. The remedial action may include, but is not limited to, limited functionality and/or limited use of feature(s) for the module that has been compromised. The remedial action may include, but is not limited to, transmitting and displaying one or more messages to a driver on an instrument cluster, wireless device, and/or via a personal e-mail address. In another example, the remedial action may also include, but is not limited to, the determination of when to re-flash the one or more compromised modules on the vehicle.

At step 602, the vehicle computing system may assign a module to be responsible for assuring security in the system such that it may periodically poll the one or more modules in the vehicle for their respective checksum values. In addition to polling the one or more modules in the vehicle, the assigned module responsible for assuring security in the system may also verify the received checksum value is equal to the as-built/service-updated stored values for the one or more modules in the vehicle at step 604.

At step 606, the vehicle computing system may transmit the received checksum value for the one or more modules to a secure server location and/or dealer network tool that can access the information regarding the build checksum values of the vehicle. The vehicle computing system may receive a checksum status from the server indicating that the one or more checksum values have been received and are being compared to the stored as built checksum values at step 608.

At step 610, the vehicle computing system may determine whether the one or more modules in the vehicle have the correct checksum values based on the received data from the server and/or from the analysis of the checksum values by the vehicle system. At step 612, in the event that the checksum value for a given module does not match the stored as-built (or updated vehicle service flash) checksum value, the vehicle system and/or server may generate or transmit a message to one or more output devices for a driver and/or a vehicle owner. The message transmitted to the one or more output devices may include, but is not limited to, an instruction to visit a dealership for service and/or instructions to enable communication with a remote server to re-program the compromised module on the vehicle.

At 614, the vehicle system may determine whether a remedial action should be enabled based on several factors including, but not limited to, which module is compromised. For example, if a module is compromised, the vehicle system may enable one or more remedial actions including, but not limited to, setting default values for the configurations/calibrations of the compromised module, ignoring messages from the compromised module, reducing powertrain power and/or shutting down the powertrain system. The reduced powertrain power mode may include, but is not limited to, limiting the vehicle acceleration, vehicle speed, and/or shutting down the engine.

At 616, the vehicle computing system may transmit a remedial action command to the one or more modules that have an incorrect checksum value. The vehicle system may also determine whether the compromised module may be corrected remotely instead of having to visit a dealership at step 618. If the vehicle computing system decides that a remote fix for the compromised module is acceptable, the system may transmit a request to receive software, calibrations, and/or configuration files for the compromised module from the secure server in communication with the vehicle at step 620.

At step 622, the vehicle computing system may receive the one or more requested files form the remote server and/or receive a message that the remote sever is ready to connect and flash to the compromised module on the vehicle. The vehicle system may determine whether it is acceptable to flash the compromised module, or if the system should wait until the vehicle is parked with the powertrain system not running at step 624.

At step 626, the vehicle computing system may determine that the vehicle is in a state where the one or more modules compromised may be flashed/updated. For example, the compromised module may be a module that controls a feature/function that may not affect the powertrain system or any other feature that may distract a driver during a re-flash if the vehicle is in operation, therefore the system may allow the flash/update to happen during vehicle operation. In another example, the vehicle computing system may only allow the one or more compromised modules to be flashed/updated when the vehicle is in park, and the ignition is in accessory mode. During accessory mode, the VCS may be in a vehicle key-on initialization state having powered-on the one or more modules. The vehicle computing system may transmit a message instructing the driver when the vehicle is in park to put the ignition into accessory mode to allow a flash/update to the one or more compromised modules to begin at step 628.

Figure 7:
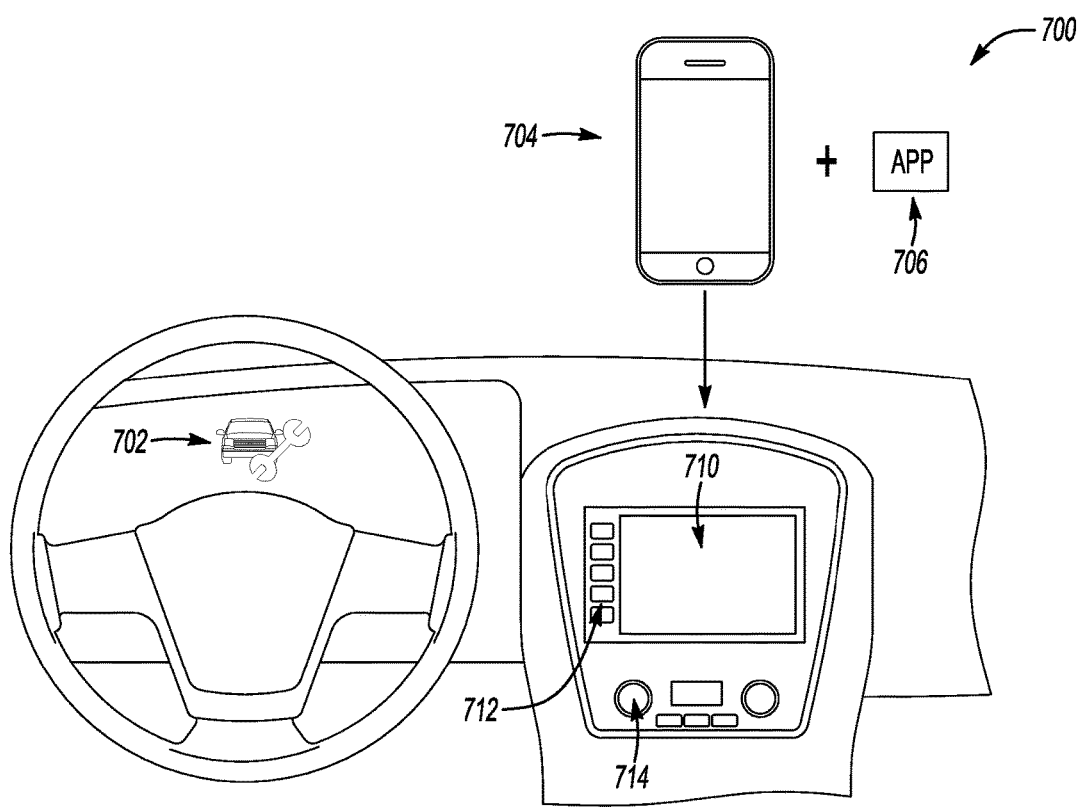
FIG. 7 is an example of an illustrative embodiment disclosing several infotainment features an occupant may interrelate with the vehicle-based computer in communication with a remote server.

FIG. 7 is an example of an illustrative embodiment disclosing several infotainment features an occupant may use to interact with the vehicle-based computer in communication with a remote server. The several infotainment features 700 may include, but are not limited to, an instrument cluster 702, a center stack liquid-crystal display (LCD) 710, one or more selector knobs for the LCD 712, and/or other selector knobs 714 that may be used as inputs when communicating with the vehicle computing system. A nomadic device 704 (e.g., smart phone) may also be in communication with the vehicle computing system with the use of one or more applications 706 embedded on the nomadic device.

The vehicle computing system may communicate to the driver using the infotainment features including the nomadic device to report when the system has detected a compromised module. The driver may enable the one or more remedial actions using the infotainment features 700 and/or the nomadic device 704. The nomadic device may also be used to connect to the remote server, such that communication between the vehicle system and the server is configured through an application 706 on the nomadic device 704.

For example, once the server and/or vehicle computing system detects a compromised module in the vehicle, a message may be sent to the instrument cluster 702 and/or center stack LCD screen 710 to service the vehicle soon. A message may also be sent to the nomadic device 704 indicating that a compromised module has been detected on the vehicle system.

The server and/or vehicle computing system may provide procedure instructions on how to remedy the compromised module using the infotainment system displays and knobs. For example, the system may allow the server to send instruction messages allowing the driver to determine whether to re-flash/update the compromised module. The vehicle computing system may transmit a message on the LCD 710 for a re-flash/update when the vehicle is in park by requesting the driver if it is acceptable to begin the installation of the appropriate program for the compromised module. The driver may accept or deny the request for an update by using the center stack knobs 712 and/or the one or more infotainment knobs 714 to navigate through the update messages when remotely programming a vehicle module.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle system comprising:
   a processor communicating with a memory having a plurality of stored checksum values each associated with one of a plurality of vehicle control modules in communication with the processor over a vehicle network, the processor configured to:
   poll the plurality of vehicle control modules and receive a current checksum associated with vehicle software in each of the plurality of vehicle control modules;
   compare each of the current checksum values with a corresponding one of the stored checksum values; and
   in response to the current checksum value of any one of the plurality of control modules not matching the corresponding one of the stored checksum values, transmit a request through a linked device to a remote server to request different software for the vehicle control module having the current checksum value that does not match.

2. The vehicle system of claim 1 wherein the processor is additionally configured to update the vehicle control module with the different software received from the remote server.

3. The vehicle system of claim 2 wherein the processor is further configured to update of the vehicle control module with the different software in response to a vehicle key-on or key-off event.

4. The vehicle system of claim 3 wherein the vehicle key-on or key-off event prepares the update of the different software based on input received from one or more infotainment system inputs.

5. The vehicle system of claim 1 wherein the processor is further configured to activate a reduced powertrain mode for a vehicle powertrain system based on the current checksum value of at least one of the plurality of vehicle control modules not matching the associated stored checksum.

6. The vehicle system of claim 1 wherein the linked device comprises a cellular phone embedded in the vehicle.

7. The vehicle system of claim 1 wherein the linked device comprises a wirelessly linked portable cellular phone.

8. A vehicle system comprising:
a processor communicating with a server via a transceiver and configured to:
transmit vehicle module software or calibration test values received from periodic polling of vehicle modules to the server;
compare the test values received from periodic polling with server-stored vehicle values associated with a vehicle identification number received via the transceiver; and
in response to the test values not matching the stored vehicle values, initiate reprogramming of the vehicle modules.

9. The vehicle system of claim 8 wherein the processor is additionally configured to initiate reprogramming of the vehicle modules to update the vehicle modules having test values not matching the stored vehicle values with software stored at the server.

10. The vehicle system of claim 9 wherein the update of the vehicle modules may be initiated in response to input received from one or more infotainment knobs.

11. The vehicle system of claim 8 wherein the processor is further configured to activate a reduced powertrain power mode in response to at least one of the vehicle modules having a test value not matching the stored vehicle value.

12. The vehicle system of claim 8 wherein the transceiver is an embedded WiFi transceiver.

13. The vehicle system of claim 8 wherein the vehicle module software or calibration test values comprise checksums.

14. A method for a vehicle comprising:
polling, via a vehicle processor, vehicle modules for associated software checksums;
transmitting the checksums to a remote server via a vehicle transceiver for evaluation;
receiving, via the transceiver, software and/or calibration data for vehicle modules associated with checksums that do not match server-stored checksums associated with a vehicle identification number of the vehicle; and
flashing the vehicle modules associated with non-matching checksums with the software and/or calibration data.

15. The method of claim 14 further comprising activating, via the processor, a reduced powertrain power mode for a vehicle powertrain system responsive to at least one of the checksums not matching the server-stored checksums.

16. The method of claim 14 wherein the flashing of the modules is performed in response to a vehicle key-on or key-off event.

17. The method of claim 14 further comprising establishing, via the processor, communication with a portable cellular phone and outputting a message associated with the vehicle modules having non-matching checksums at a display of the portable cellular phone.

18. The method of claim 17 wherein the portable cellular phone in communication with the processor is linked by BLUETOOTH technology.

* * * * *